United States Patent [19]

Michellone

[11] 3,802,748

[45] Apr. 9, 1974

[54] PRESSURE REGULATOR FOR AN HYDRAULIC BRAKING SYSTEM

[75] Inventor: Giancarlo Michellone, Turin, Italy

[73] Assignee: Flat Societa Per Azioni, Turin, Italy

[22] Filed: Dec. 6, 1972

[21] Appl. No.: 312,525

[30] Foreign Application Priority Data
Dec. 11, 1971 Italy.................................. 71051/71

[52] U.S. Cl............. 303/21 F, 137/493, 188/181 A
[51] Int. Cl.................................................. B60t 8/06
[58] Field of Search...................... 303/21 F, 61–63, 303/68–69, 10; 188/181; 137/493, 496, 493.8

[56] References Cited
UNITED STATES PATENTS
3,719,401   3/1973   Peruglia............................ 303/21 F
3,729,233   4/1973   Mangold........................... 303/21 F

*Primary Examiner*—Milton Buchler
*Assistant Examiner*—D. C. Butler
*Attorney, Agent, or Firm*—Sughrue, Rothwell, Mion, Zinn & Macpeak

[57] ABSTRACT

A hydraulic regulator for use in an anti-skid braking system and operative to allow a rapid increase of braking pressure when the brakes are first applied, but which only allows a relatively slow increase in the braking pressure after the anti-skid control system has operated to release the braking pressure so that undue jerkiness during anti-skid braking action is avoided. This is achieved by means of a valve having two separate paths between an input end which is connectable to the source of braking pressure, and an output end which is connectable to the brake actuators; one of the paths allows free travel of the fluid but is closed when there is a pressure difference greater than a predetermined threshold across the regulator, and the other passageway includes a restrictor throttle through which fluid can flow only at a reduced rate.

6 Claims, 2 Drawing Figures

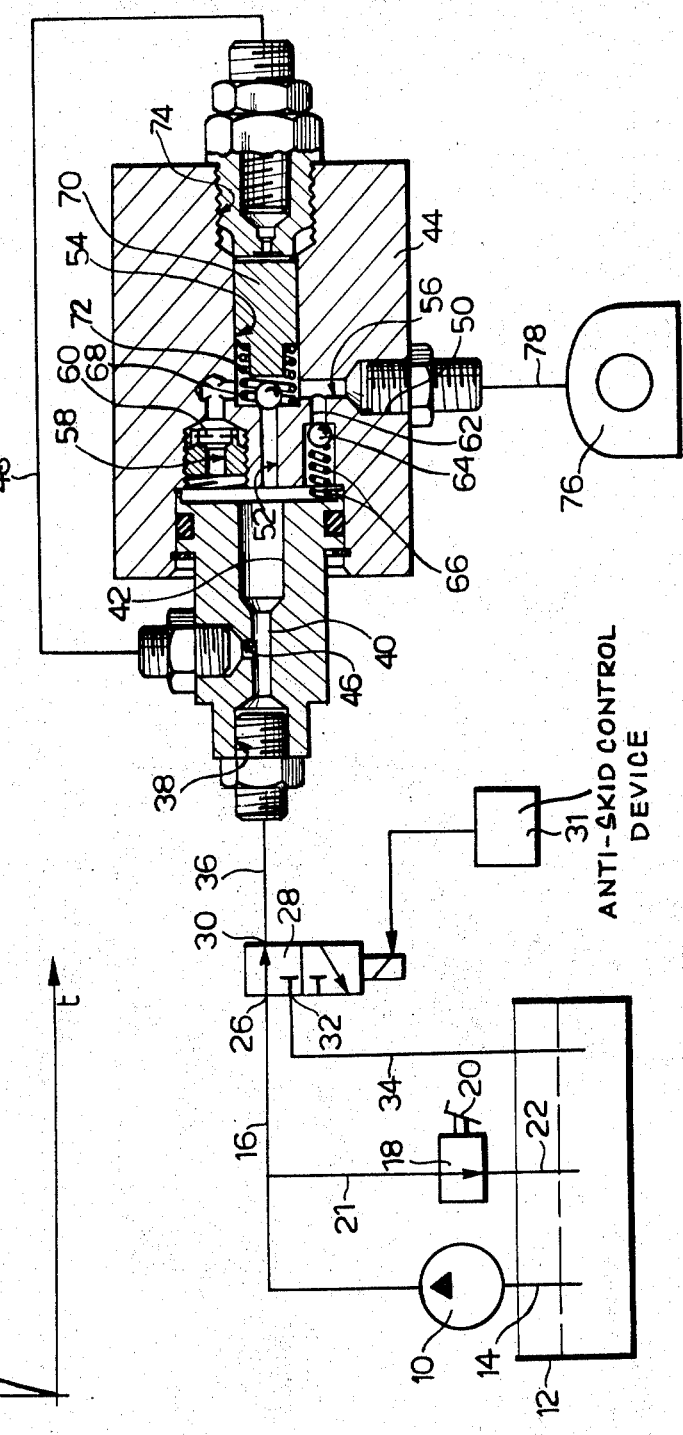

3,802,748

PRESSURE REGULATOR FOR AN HYDRAULIC BRAKING SYSTEM

BACKGROUND OF THE INVENTION

The present invention relates to hydraulic braking systems, and in particular to an hydraulic regulator for controlling the rate of increase of pressure in selected circumstances. Embodiments of the present invention are particularly suitable for use in hydraulic anti-skid braking systems.

One of the problems of supplying pressure fluid to a brake actuator of an anti-skid braking system is the jerkiness of the repeated automatic brake releasing and applying operations which occur when the system is in anti-skid mode of operation, that is when the part of the system sensitive to the dynamic state of a wheel or the wheels indicates that it is in a state of incipient skid.

This problem is described in detail in a number of previous Patent Applications by the same Applicant and particularly in Italian Pat. application No. 68,411 A/71. In this application there is specifically described the requirement that, for proper operation of the braking system when the anti-skid system is in operation the rate of increase of braking pressure should be different from the rate of decrease of braking pressure in such a way that for normal braking operations the pressure can increase rapidly in order to ensure adequate and effective braking, but when the anti-skid control device operates there should be a less rapid increase in braking pressure in order to avoid jerking of the vehicle leading to a decrease of its stability and general loss of braking efficiency.

OBJECT OF THE INVENTION

The main object of this invention is therefore the provision of a device which allows this type of response so that braking will be effective in virtually any circumstance and on any type of road surface.

SUMMARY OF THE INVENTION

According to the present invention a hydraulic anti-skid braking system for a motor vehicle comprises a controllable source of fluid pressure, for applying pressure to at least one brake actuator via valve means controlled by an anti-skid control device of known type, operable to reduce the pressure transmitted from the source of pressure to the brake actuator when the braked wheel enters a state of incipient skid, characterized in that the said valve means are connected to the said brake actuator via a fluid pressure regulator, including a first chamber connected to receive fluid from the valve means, an output port connected to the brake actuator, a first passageway between the first chamber and the output port, control means sensitive to the pressure of fluid between the first chamber of the regulator and the said valve means, operative to close the said first passageway if the said pressure decreases at a rate greater than a given rate after having reached a predetermined threshold value, and a restrictor throttle passage between the first chamber and the output port, through which fluid can flow when the said first passageway is closed.

The present invention also comprehends a pressure regulator for an hydraulic anti-skid braking system of the type comprising a controllable source of fluid pressure for applying pressure to at least one brake actuator via valve means controlled by an anti-skid control device of known type, operable to reduce the pressure transmitted from the source of pressure to the brake actuator when the braked wheel enters a state of incipient skid, the regulator comprising a first chamber connectable to receive fluid from the valve means, an output port connectable to the brake actuator, a first passageway between the first chamber and the output port, control means sensitive to the pressure of fluid upstream of said first chamber, operative to close the said first passageway if the said pressure decreases at a rate greater than a given rate after having reached a predetermined threshold value, and a restrictor throttle passage between the first chamber and the output port, through which fluid can flow when the said first passageway is closed.

Further advantages and objects of the invention will become apparent during the course of the following description with reference to the accompanying drawings which is given purely by way of non-restrictive example.

BRIEF DESCRIPTION OF THE DRAWINGS

FIG. 1 diagrammatically illustrates an anti-skid braking system incorporating an embodiment of the invention; and FIG. 2 is a diagram illustrating a typical variation of braking pressure with time, in use of the embodiment of FIG. 1.

DESCRIPTION OF THE PREFERRED EMBODIMENTS

Referring to FIG. 1, there is shown a volumetric hydraulic pump 10 which, when in operation continuously draws hydraulic fluid from a reservoir 12, via a pipe 14, and delivers it under pressure to a delivery pipe 16. A modulator valve 18 which is controlled by a brake pedal 20 normally allows communication between a pipe 21 which connects with the delivery pipe 16, and a discharge pipe 22, which leads to the reservoir 12 so that the delivery pressure in the pipe 16 is virtually nil while the modulator valve 18 remains fully open. Operation of the brake pedal 20 causes a gradual reduction of the path of fluid through the valve 18, thereby causing an increase of pressure in the pipe 16.

The pipe 16 is connected to an input port 26 of an electrically operated valve 28 (referred to hereinafter as an electrovalve) of a known type; this valve is normally open, and it allows communication between the input port 26 and an output port 30.

The electrovalve 28 is connected to be energized by a signal from an anti-skid control device 31, of any suitable known type, such as for example that described in Italian Pat. application No. 67,085 A/70, which is arranged to generate an output signal when one or more wheels of the vehicle are in an incipient skid state. When the electrovalve 28 is energized, the input port 26 thereof is closed and the output port 30 is connected to a discharge port 32, to which there is connected a pipe 34 which leads to the reservoir 12.

The output port 30 of the electrovalve 28 is connected, via a pipe 36, to an input port 38 of a regulator device constructed as an embodiment of this invention. The input port leads to a venturi tube 40, which ends in a chamber 42. Roughly half way along the venturi tube 40 there is a lateral opening 46 which communicates with a pipe 48 which leads to a port 74 at the other end of the regulator for a purpose which will be described below.

The chamber 42 of the regulator 44 communicates with a delivery port 50 of the regulator via three parallel paths. The first path comprises an opening 52 communicating with the chamber 42, and with an intermediate chamber 54. The intermediate chamber 54 communicates with the delivery port 50 through a transverse opening 56. A passageway 58, having a constriction 60, also connects the chamber 42 of the regulator 44 with the intermediate chamber 54, thereby forming a second path. Finally, a unidirectional valve 62 connects the chamber 42 with the transverse passage 56 which connects the chamber 54 to the output port. The unidirectional valve 62 is normally closed by a small ball 64, urged to a closed position by a spring 66.

A shutter ball 68 is enclosed with the intermediate chamber 54 and is free to move therein leaving the passageway 52 normally open, but it can be thrust against the end of the passageway 52, to close it, by the movement of a piston 70 which is slidable in the chamber 54 and biased away from this position by a biasing spring 72. The piston is urged toward the closed position against the action of the spring 72 by a control pressure which is applied through the port 74 via the pipe 48.

The delivery port 50 of the regulator 44 is connected by a pipe 78 to the brake actuators 76 of the vehicle, these may be, for example, the piston and cylinder of disc brake calipers, or any other suitable type of actuator.

Under normal operating conditions of the braking system, that is, when the braked wheel or wheels do not undergo deceleration so great as to cause a state of imminent skid, the anti-skid control device 31 does not produce an output signal, so the electrovalve 28 remains unenergized. Thus, when the brake pedal 20 is operated to exert pressure via the pipe 16; due to this pressure fluid passes through the electrovalve 28 to the input port 38 of the regulator 44. The fluid then passes through the venturi tube 40, with a slight reduction in pressure and reaches the pipe 42.

Owing to the venturi effect, pressure in the passage 46 is very low, and thus not enough to induce movement of the piston 70. Consequently the shutter ball 68 is free to move and the passageway 52 is open. The fluid pressure in the chamber 42 is thus freely transmitted to the brake actuators 76 via the longitudinal passage 52, the intermediate chamber 54, the transverse passage 56, and the pipe 78. Upon release of the brake pedal 20, the fluid in the pipe 78 is able to flow out freely through the unidirectional valve 62, 64.

During the initial phase of each braking operation, the venturi tube 40 only allows a gradual build up of pressure in the pipe 48 through the passage 46, so that the full braking pressure can be applied quickly and in an unrestricted manner. If the anti-skid control device 31 should operate the pipe 36 is coupled to the pipe 32 by the electrovalve 28 and the fluid is discharged from the pipe 78 via the unidirectional valve 62, 64, the venturi tube 40, and the discharge passage of the electrovalve 28 to the reservoir; the pressure built up in the pipe 48, however, can only discharge slowly, so the pressure difference thus produced causes the piston 70 to move, pressing the shutter ball 68 against the longitudinal vent 52, and closing it. Therefore, if the electrovalve 28 returns to its normal condition, before this situation has changed, and once more applies a pressure to the port 38, then fluid pressure can pass from the chamber 42 of the regulator 44, to its output port 50, only through the constriction 60, thus causing only a gradual increase of pressure at the brake actuators 76. This effect is repeated for any or each subsequent brake actuating and releasing cycle which may occur in any one braking operation, for as long as the anti-skid braking device 31 continues to produce an output signal to energise the electrovalve 28.

At the end of any braking operation, all the fluid pressure discharges freely to the reservoir 12, and the circuit returns to its original state, ready for another braking operation.

The venturi tube 40 at the input of the regulator 44 ensures that movement of the piston 70 towards the control ball 68 is not incorrectly effected by a sudden and heavy application of braking pressure from the source 10, due to a sudden closure of the valve 18, such as, for example, during emergency braking. Thus attenuation of the flow of hydraulic fluid to the brake actuators 76 should occur only during a braking operation when the anti-skid system acts to prevent skidding.

Pressurization of the control port 74 of the regulator 44 could, of course, be effected by alternative means. For example, the pipe 48, instead of being connected to the passage 46 of the venturi tube 40, could be connected to a point of the pipe 16 upstream of the electrovalve 28. Similarly the electrovalve 28 could be replaced by a different type of anti-skid system; the anti-skid control characteristics of the regulator would remain the same, since this is responsive only to a reduction of brake pressure.

We claim:

1. In a hydraulic anti-skid braking system for at least one wheel of a motor vehicle, of the type comprising, a source of fluid pressure,
brake actuating means,
brake pedal means, for selectively applying fluid pressure from said source to said brake actuating means,
anti-skid valve means between said source of fluid pressure and said brake actuating means,
anti-skid control means sensitive to the dynamic state of said at least one braked wheel, said anti-skid control means operating to control said anti-skid valve means to release the braking pressure when said wheel enters a dynamic state of incipient skid, the improvement wherein there is provided fluid pressure regulator means between said anti-skid valve means and said brake actuator means, said fluid pressure regulator means comprising:
means defining a first chamber connected to receive fluid from said anti-skid valve means,
means defining an output port connected to said brake actuators,
a first passageway between said first chamber and said output port,
control means sensitive to the pressure of fluid between said anti-skid valve means and said first chamber of said regulator, said control means operating to close said first passageway in response to a drop in said fluid pressure at a rate greater than a given rate from a pressure greater than a given threshold value, and means defining a restrictor throttle passage between said first chamber and said output port through which fluid can flow when said first passageway is closed by said control means.

2. The hydraulic braking system of claim 1 wherein said regulator also includes:
means defining a further passageway between said first chamber and said output port, and
unidirectional valve means in said further passageway.

3. The hydraulic braking system of claim 2 wherein said unidirectional valve allows fluid flow only from said output port to said first chamber of said regulator.

4. The hydraulic braking system of claim 1 wherein said control means includes:
valve means operable to open or close said first passageway,
a second chamber in said regulator, said second chamber providing communication between said first passageway and said output port,
a piston slidable in said second chamber between a first position where it opens said valve means in said first passageway and a second position where it closes said valve means in said first passageway,
a control port of said regulator communicating with said second chamber, and
means interconnecting said control port and a pressure take-off point in said system between a control valve of said system and said first chamber whereby said piston is urged to move to said second position when there is a pressure difference between said control port of said regulator and said pressure take-off point.

5. The hydraulic braking system of claim 4 wherein said pressure take-off point and said interconnecting means comprise,
a venturi tube in series between said control valve of said system and said first chamber of said regulator,
an intermediate lateral opening in said venturi tube, and
a conduit connecting said intermediate lateral opening to said control port of said regulator.

6. A pressure regulator for an hydraulic anti-skid braking system of the type comprising,
a source of fluid pressure,
brake actuating means,
brake pedal means, for selectively applying fluid pressure from said source to said brake actuating means,
anti-skid valve means between said source of fluid pressure and said brake actuating means,
anti-skid control means sensitive to the dynamic state of said at least one braked wheel, said anti-skid control means operating to control said anti-skid valve means to release the braking pressure when said wheel enters a dynamic state of incipient skid, said regulator being connectable between said anti-skid valve means and said brake actuator means, and having
means defining a first chamber for connection to receive fluid from said anti-skid valve means,
means defining an output port for connection to said brake actuators,
a first passageway between said first chamber and said output port,
control means sensitive to the pressure of fluid at the entrance to said first chamber of said regulator, said control means operating to close said first passageway in response to a drop in said fluid pressure at a rate greater than a given rate from a pressure greater than a given threshold value, and
means defining a restrictor throttle passage between said first chamber and said output port through which fluid can flow when said first passageway is closed by said control means.

* * * * *